US006857638B2

(12) United States Patent
Dupont et al.

(10) Patent No.: US 6,857,638 B2
(45) Date of Patent: Feb. 22, 2005

(54) GASKET FOR SANITARY FITTINGS

(75) Inventors: Paul Robert Dupont, Blairstown, NJ (US); Colin W. Haase, Western Springs, IL (US)

(73) Assignee: Rubber Fab, Inc., Andover, NJ (US)

( * ) Notice: Subject to any disclaimer, the term of this patent is extended or adjusted under 35 U.S.C. 154(b) by 0 days.

(21) Appl. No.: 10/367,068

(22) Filed: Feb. 14, 2003

(65) Prior Publication Data

US 2004/0160018 A1 Aug. 19, 2004

(51) Int. Cl.$^7$ ............................. F16L 33/16; F16L 17/06
(52) U.S. Cl. ..................... 277/608; 277/611; 277/616; 277/626; 285/336
(58) Field of Search ................................. 277/602, 603, 277/606, 608, 609, 614, 626, 627, 628, 630, 640, 644, 611, 638, 639, 616; 285/336

(56) References Cited

U.S. PATENT DOCUMENTS

| 2,789,844 | A | * | 4/1957 | Kessler | 285/336 |
|---|---|---|---|---|---|
| 3,110,471 | A | * | 11/1963 | Kihles | 251/318 |
| 3,195,906 | A | * | 7/1965 | Moyers | 277/611 |
| 3,704,021 | A | * | 11/1972 | Barbarin et al. | 277/611 |
| 3,775,832 | A | * | 12/1973 | Werra | 29/450 |
| 4,095,809 | A | * | 6/1978 | Smith | 277/611 |
| 4,568,115 | A | | 2/1986 | Zimmerly | |
| 4,936,818 | A | * | 6/1990 | Holohan, Jr. | 493/396 |
| 5,749,586 | A | | 5/1998 | Abe | |
| 5,947,533 | A | * | 9/1999 | Fisher et al. | 285/350 |
| 5,971,399 | A | | 10/1999 | Hashimoto | |
| 6,039,319 | A | * | 3/2000 | Coonce et al. | 277/314 |
| 6,267,414 | B1 | * | 7/2001 | Mosse | 285/24 |
| 6,318,576 | B1 | | 11/2001 | Graham | |
| 6,367,803 | B1 | * | 4/2002 | Loth | 277/321 |

FOREIGN PATENT DOCUMENTS

| CA | 732508 | * | 4/1966 |
|---|---|---|---|
| DE | 004136200a1 | * | 5/1993 |
| GB | 0798650 | * | 7/1958 |

OTHER PUBLICATIONS

"Hygienic Pipe Couplings", prepared by Subgroup Pipe Couplings of the European Hygienic Equipment Design Group (EHEDG), Feb. 1995, for DIN, German Institute for Standardization, pp1–10.

* cited by examiner

Primary Examiner—Alison Pickard
Assistant Examiner—Vishal Patel
(74) Attorney, Agent, or Firm—Howard R. Popper

(57) ABSTRACT

A gasket for establishing a seal between the flanges of sanitary pipe fittings having a lumen of pre-determined diameter which comprises an O-ring portion of elastomeric material and an incompressible ring member bonded to said O-ring portion, said ring member having a substantially flat cross-section to limit compression of the O-ring.

4 Claims, 5 Drawing Sheets

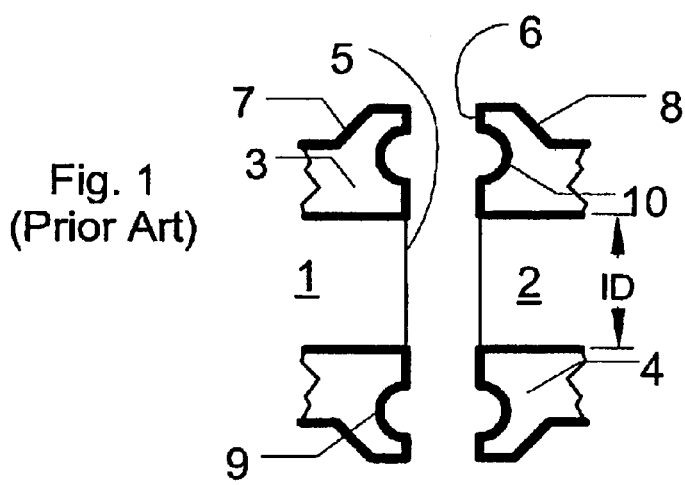
Fig. 1
(Prior Art)
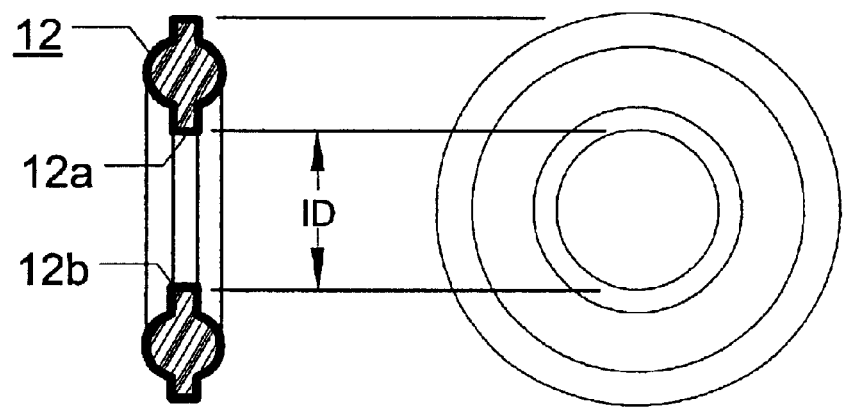
Fig. 2
(Prior Art)
Fig. 3
(Prior Art)
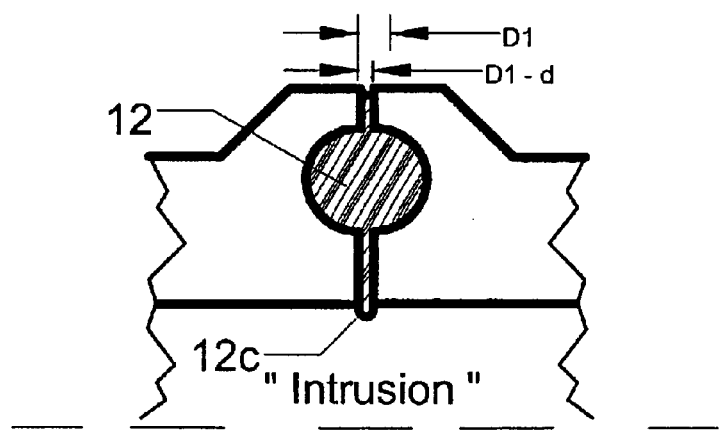
Fig. 4
(Prior Art)

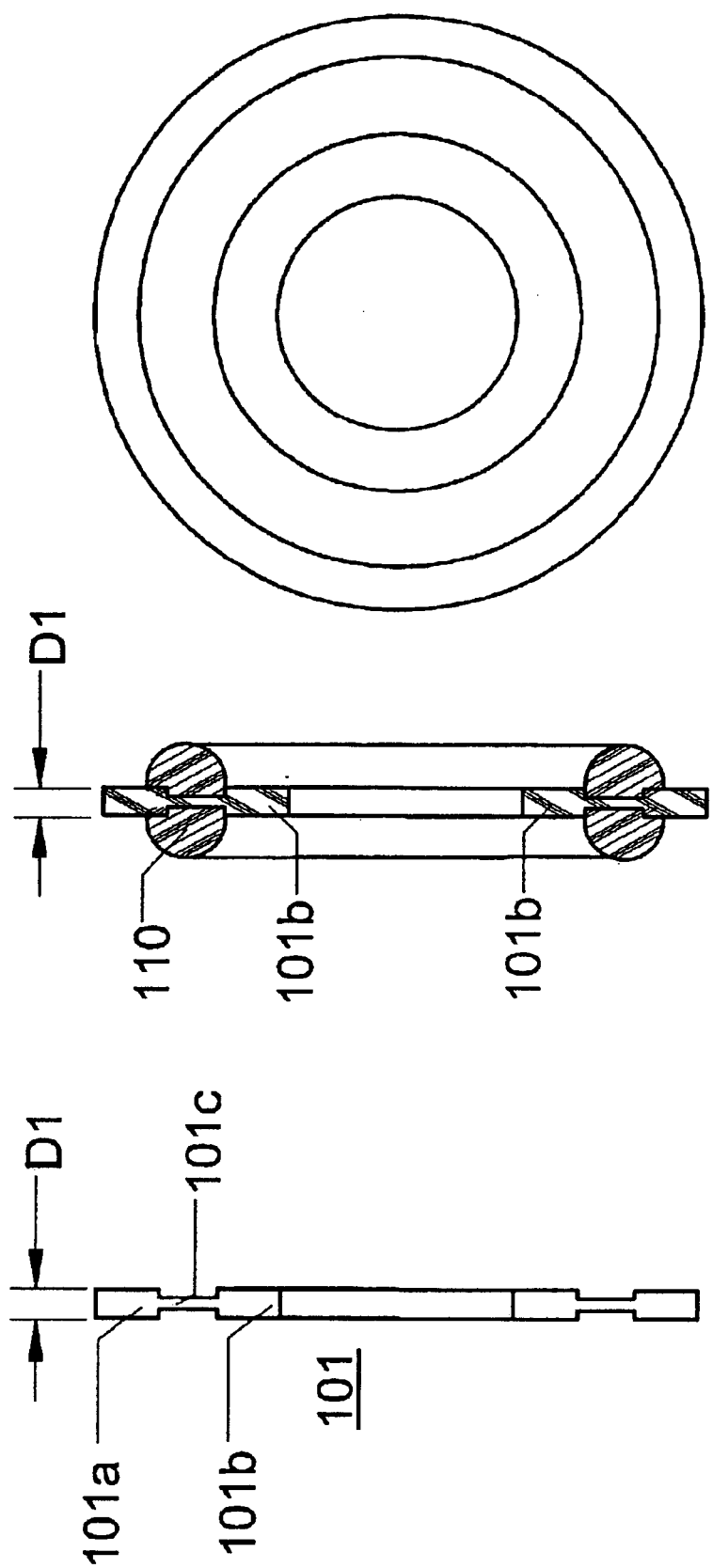

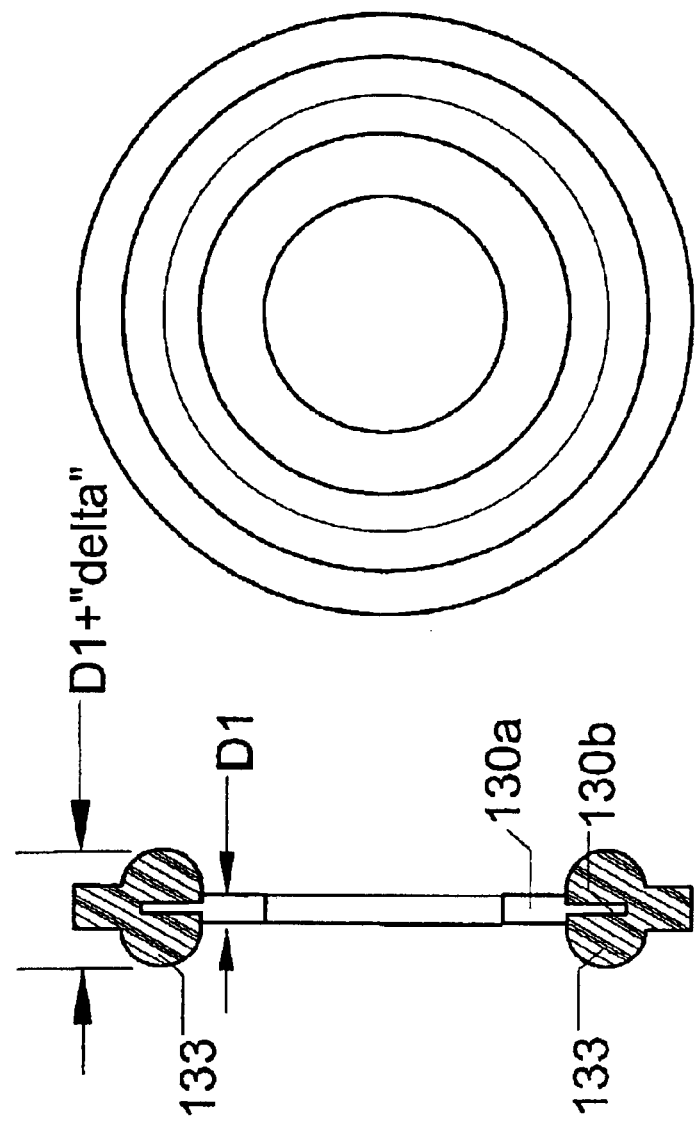
Fig. 15
Fig. 14
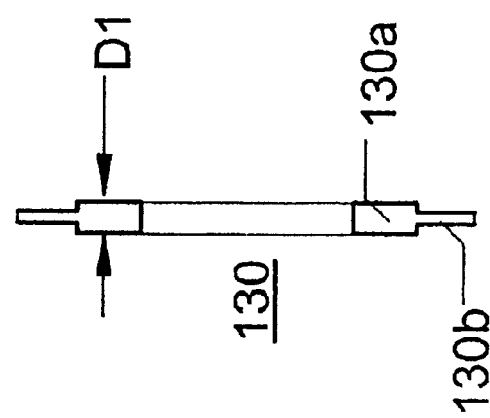
Fig. 13

GASKET FOR SANITARY FITTINGS

FIELD OF THE INVENTION

This invention relates to sanitary fitting and, more particularly, to gaskets for such fittings.

BACKGROUND OF THE INVENTION

Plants processing foods, pharmaceuticals, biological and technological fluid materials generally require fluid piping systems that must be free from voids and crevices to prevent accumulations of materials, that can readily be taken apart for periodic cleaning and that can withstand the application of CIP (clean in place) solutions and steam cycles used for cleaning. The gasket material used at joints in the piping systems must have appropriate resiliency and resistance against deterioration by the chemical and physical characteristics of the fluids under the conditions of temperature and pressure occurring during santization, such as the use of 15 psi saturated steam, hot, de-ionized water or hot WFI (water for injection). One early form of sanitary coupling, shown in U.S. Pat. No. 2,985,470, employed a conical gasket machined from polymeric tetrafluoroethelene that provided a pair of parallel, conical surfaces with cylindrical inner and outer surfaces. More recently, assembly and disassembly of pipe sections has been facilitated by using flanged pipe ends held together by hinged clamps rather than by threaded coupling, such as shown in U.S. Pat. No. 4,568,115. The flanged pipe ends may be sealed against leakage through the use of O-ring gaskets, such as shown in U.S. Pat. Nos. 5,904,382 and 5,971,399.

The '382 patent noted that the gasket shown in the '470 patent was subject to being objectionably deformed when clamped between opposed ends of the pipes of a pipe fitting so that it became unusable after several uses. In an attempt to make the gasket re-usable, the '399 patent resorted to a gasket made of porous, composite materials having different densities and which were differently compressible, so as to offer both effective sealing as well as resistance to cold flow.

In the light of the requirements set forth in a 1995 report prepared by the Subgroup Pipe Couplings of the European Hygienic Equipment Design Group entitled "Hygienic Couplings", dealing with joint sealing against contamination by microorganisms, each of these prior art approaches may be seen to have some short-comings. Among the points made in the report is that, to provide a bacteria-tight seal, valleys in the surface profile of the coupling joint must be filled by the elastomeric gasket material, typically by tightening the fastening device holding the coupling together, until sufficient contact pressure is applied. If too little contact pressure is applied by the fastening device, valleys in the surface profile will not be adequately filled to prevent accumulation of micro-organisms and if too much pressure is applied the gasket material may be extruded into the pipe lumen thereby causing an obstruction or partial dam that could cause material to be trapped.

One approach to obtaining the desired degree of gasket compression is to use a torque wrench on the clamping screw of the clamp holding the pipe sections together. Another approach is disclosed in my U.S. Pat. No. 6,082,941, assigned to the assignee of the present invention in which the tightening of the coupling is controlled by a torque-limiting fastener.

While the foregoing approaches offer some protection against over-compression of the gasket material, it would be desirable to provide a gasket suitable for use with sanitary pipe couplings that itself prevented intrusions into the lumen of the sanitary piping.

SUMMARY OF THE INVENTION

In accordance with the principles of the invention, a departure from prior art sealing techniques is achieved in which deformation of the gasket is automatically limited. The gasket of the invention, which may advantageously be employed for use in sanitary pipe couplings, is provided with a variety of sections situated radially outward from each other and from the pipe lumen. A first, radially innermost section, is preferably flat and disk-shaped and made of elastomeric material which provides for sealing of the sanitary pipe lumen against leakage when suitably compressed by the making-up of the pipe flanges. A second, generally annular section, such as that of an O-ring, departs from prior art O-ring usage by not being used primarily used for sealing of the pipe lumen. Instead, the annular section provides for alignment of the gasket with the facial recess of the pipe flange so that the first section will not intrude into the pipe lumen. The third, preferably metallic, section of the inventive gasket lies radially outboard of the O-ring section and, regardless of the tightening torque applied to the screws when making-up the coupling flanges, limits the degree to which the flange faces may approach each other and thereby limits the compressive forces that can be applied to the radially innermost sealing portion of the gasket.

BRIEF SUMMARY OF THE DRAWING

The foregoing and other objects and features of the present invention may become more apparent from a reading of the ensuing description together with the drawing in which:

FIG. 1 shows prior art sanitary pipe fittings equipped with flanges for receiving an O-ring sealing gasket;

FIGS. 2 and 3 show cross-section and plan views of a prior art gasket for use with the sanitary fittings of FIG. 1;

FIG. 4 shows a section through the joint between prior art sanitary fittings using the prior art gasket demonstrating the intrusion into the pipe lumen caused by over-tightening the clamp;

FIGS. 10, 11 show cross-sectional views and FIG. 12 shows an end view of a second alternative embodiment of the gasket of the invention; and FIGS. 13, 14 show cross-sectional views and FIG. 15 shows an end view of a third alternative embodiment of the gasket of the invention.

DESCRIPTION

Figures 5, 6:
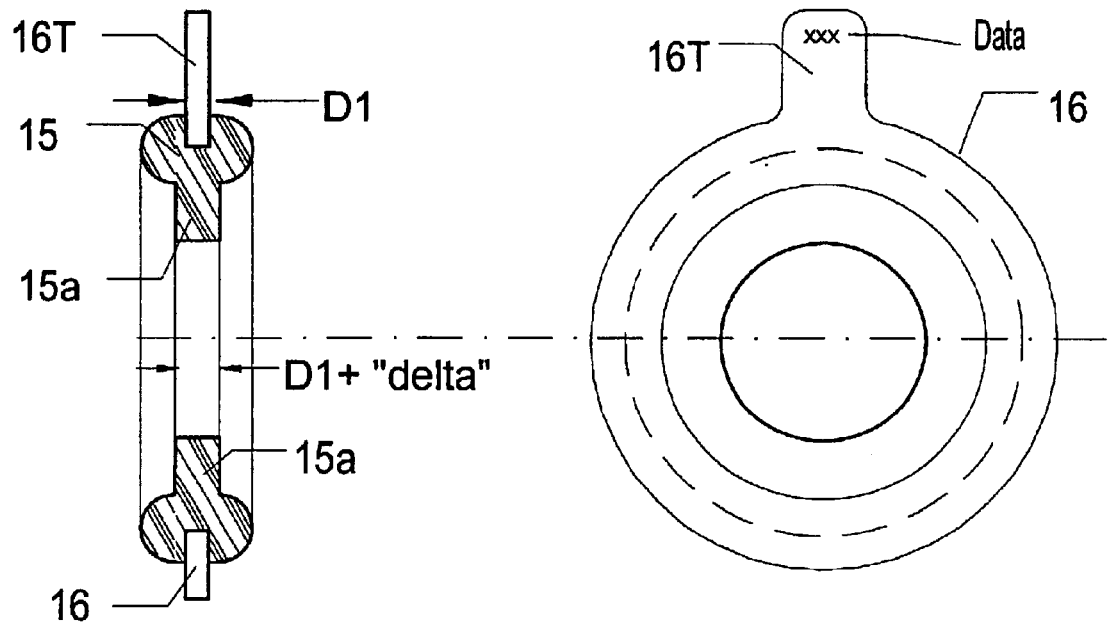
FIGS. 5 and 6 are cross-section and plan views of the improved gasket of the invention which prevents intrusion of gasket material into the pipe lumen.

A pair of prior art pipe ends equipped with sanitary pipe flange fittings 1, 2 is shown in FIG. 1. Sanitary pipe fittings 1, 2 have flanges 3, 4 with substantially flat facing faces 5, 6 each of which has a recess or annular groove 9, 10 that is designed to accommodate sealing gasket. Typically, a simple O-ring gasket (not shown) or preferably, an O-ring 12, FIGS. 2, 3, fitted with peripheral flat, compressible sections 12a, 12b of elastomeric material, such as shown in U.S. Pat. No.

6,318,576, may be used. Let it be assumed that the original thickness of portions 12a, 12b is "T".

The pipe fittings are made-up by tightening the screw (not shown) of a conventional hinged clamp (not shown, but see U.S. Pat. No. 4,568,115). The hinged clamp exerts a camming action on the exterior beveled shoulders 7, 8 of flanges 3, 4 forcing flat faces 5, 6 against each other and compressing the gasket 12 (FIG. 2) between them. Unfortunately, as shown in FIG. 4, if the clamp is tightened too much in an effort to prevent leakage at the joint, the gasket 12 will be unduly compressed to a thickness of "T-t", causing, a portion 12c of gasket 12 to be extruded into the interior lumen ID at the joint between pipes 1,2. The intrusion of the gasket 12 into the pipe lumen creates a situation where, contrary to the requirements of the aforementioned report, extruded portion 12c constitutes a barrier to the smooth flow of material carried by the sanitary pipes which may contribute to the accumulation of debris at the pipe joint. Although excessive tightening at the clamp can be avoided by using a torque wrench on the clamp screw, applying the appropriate torque for each size of fitting and type of sealing gasket, and elastomeric material would require resort to a table of reference values.

Empirical data tends to show that with an elastomeric gasket having a Shore A hardness of 70°, a minimum contact pressure of 1.5 N/mm² is required. This contact pressure corresponds to an elastomeric gasket being compressed by 15 per cent of its original thickness. When a gasket is fabricated of elastomeric material, compressing one dimension of the gasket results in expansion of its other dimension, but the total volume of gasket material remains constant. Thus, assuming that a gasket having an original thickness of T is compressed an amount t (by tightening of the clamp), the width dimension of the gasket, W, will increase by an amount w. It is easy to show that the percentage increase in the width dimension may be greater than the percentage decrease in the thickness dimension: The percentage decrease based on the original thickness may be expressed as:

$$\frac{T-t}{T} \quad (1)$$

while the percentage increase based on the original width may be expressed as:

$$\frac{W+w}{W} \quad (2)$$

Applying the assumption that the gasket volume (WT) will remain constant means that:

$$(W+w)*(T-t)=WT. \quad (3)$$

From equation (3) it is seen that the fractional increase in width is given by:

$$\frac{(W+w)}{W} = \frac{WT}{(T-t)W} = \frac{T}{T-t} = \frac{1}{1-\frac{t}{T}} \quad (4)$$

For example, let it be assumed that $$\frac{t}{T}$$

is 20%, equation (4) above shows that $$\frac{W+w}{W}$$

will be $$\frac{1}{1-0.2} = 1/0.8 = 1.25 \text{ or } 25\% \text{ greater,}$$

i.e., the percentage increase in width is greater than the percentage decrease in thickness. Thus, overtightening of the clamp can cause a greater percentage intrusion of the gasket's width into the lumen of the pipe than the percentage by which the thickness of the gasket has been decreased. This is important because sanitary standards dictate that this expansion (extrusion) not be so great as to cause any projection into the pipe lumen as doing so may provide an intrusion, obstruction or partial dam that could cause material to be accumulated from the fluid stream at the gasket's surface.

Figure 7:
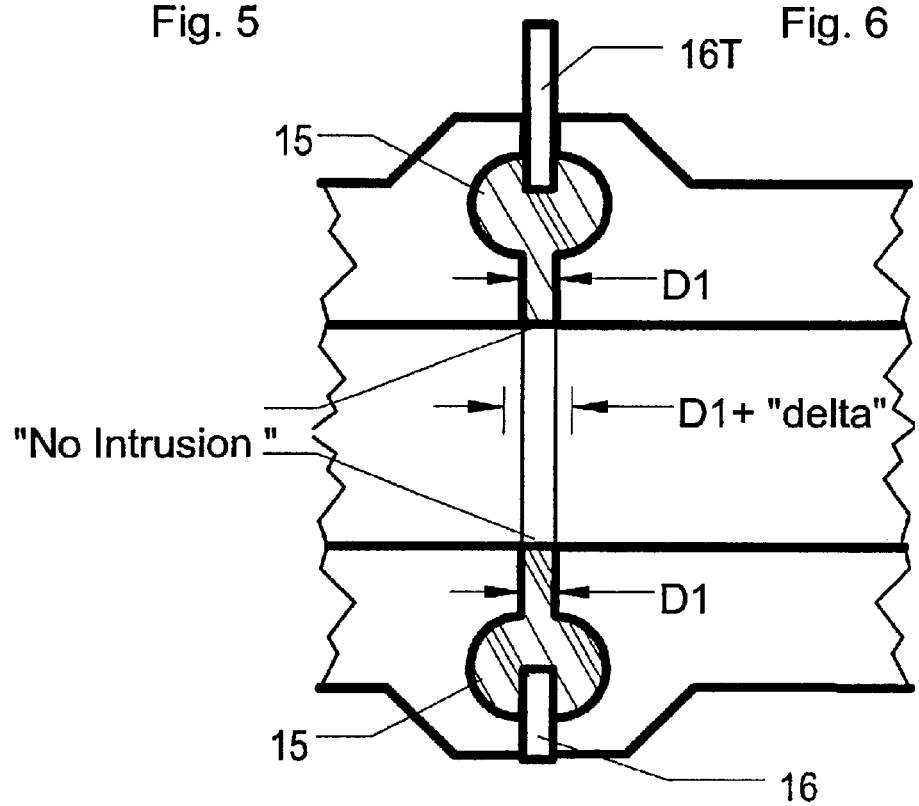
FIG. 7 shows a section through the joint between sanitary fittings using the gasket of the invention.

To avoid the need for torque wrenches or special tools to limit the compressive force on the sealing gasket when the sanitary joint is made-up, the composite gasket 15, 16 of the invention has been devised. The gasket is shown in cross-section in FIG. 5 and in plan view in FIG. 6. When the sanitary joint is made-up, as shown in FIG. 7, the incompressible portion 16 of the gasket limits the amount that the pipe flanges can compress the elastomeric portion 15a so that portion 15a cannot be extruded into the pipe lumen. When the sanitary joint is made-up, the flat portion 15a of the gasket should be compressed (illustratively of the order of 20%) by an amount "delta" so that the gasket's compressed thickness "D1", will not cause any intrusion of the gasket material into the lumen of the joint. This means that prior to compression, the elastomeric portion 15 should have a thickness D1+"delta". To limit the amount of compression which the clamp can apply, gasket 15 includes an incompressible portion 16 whose thickness is D1 so that the flat elastomeric portion 15a of gasket 15 will be compressed only by the amount "delta" to the optimum thickness D1. In this embodiment, the flat portion of the gasket 15a, 15b provides the principal sealing function while the O-ring body portion of gasket 15, unlike prior art O-ring gaskets, advantageously functions primarily to align the gasket with the recesses 9, 10 of flanges 3, 4 and provides only an incidental sealing function. The incompressible portion of the gasket advantageously includes an extension tab 16T which facilitates the inclusion of identifying data "xxx" as to the material of which the elastomeric and/or incompressible portions are made, the date of manufacture, etc. In addition, the incompressible portion 16 as well as tab 16T may be color-coded to indicate the applicability of the gasket material to the type of fluid to be carried by the sanitary piping.

Figure 8:
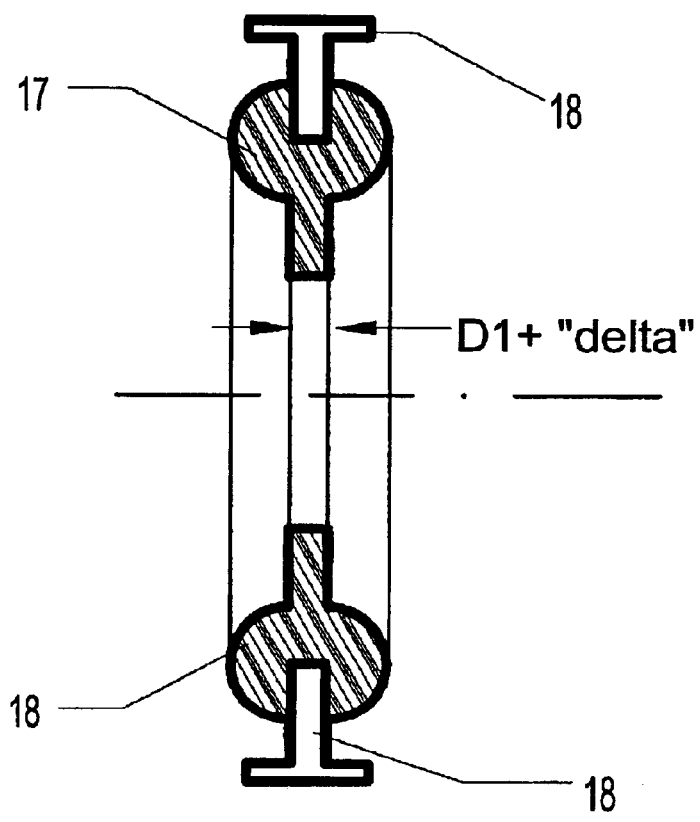
FIGS. 8 and 9 show cross-sectional views of a first alternative embodiment of the gasket of the invention.
Figure 9:
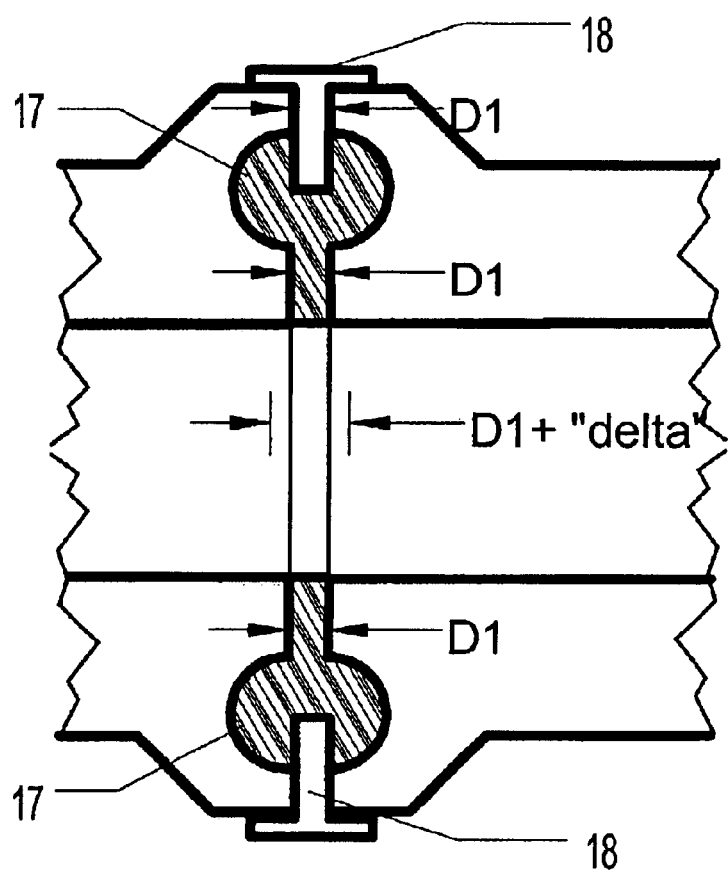

FIG. 8 shows an alternative form of gasket comprising a body of elastomeric material 18 and a "T"-shaped incompressible portion 18. As shown in FIG. 10, the T-shaped portion serves two purposes. First, it helps align the gasket to the outside diameter of the sanitary pipe fitting and may be made snug fitting so that the gasket is retained on one pipe end while the other pipe end is aligned thereto and the clamp (not shown) made up. Secondly, as shown in edge view FIG. 9, the outer periphery of the T-section is made large enough so that it can be labelled to indicate its size, quality and/or the material of which it is made, as well as the batch number and date of manufacture. Further, the T-portion may be of a color and or contain stripes or dots of a different color to indicate at a glance what the gasket is made of. For example, the following table illustrates the colors assigned to various gasket materials useable for sanitary couplings:

| Material | Color |
|---|---|
| EPDM | Green |
| Silicone | Pink |
| Viton | Orange + White |
| Buna | Red dots |

A further embodiment is shown in FIGS. 10, 11 and 12 in which an incompressible member 101 contains two substantially flat portions 101a and 101b separated by a web portion 101c. The incompressible portions 101a and 101b limit the amount of compression to which the elastomeric O-ring portion can be compressed when the sanitary pipe joint is made up.

A still further embodiment is shown in FIGS. 13, 14 and 15 in which the incompressible portion also contains two flat portions 130a and 130b which, however, are advantageously of different thickness to facilitate the bonding to and alignment of elastomeric portion 133. In this embodiment the thicker cross-section portion 130a has a thickness D1 which limits the amount that the elastomeric O-ring portion, whose thickness is D1+"delta", can be compressed when the sanitary pipe joint is made up. It is an aspect of this embodiment that the elastomeric portion 133 and the incompressible portion 130 need not necessarily be bonded together but may advantageously be removable.

Typical values of the dimensions and materials used in an illustrative embodiment are as follows:
ID of Lumen=ID of gasket=1.90 in; OD of gasket=2.312 in.
D1=0.060 in.
D1+delta=0.090 in.
Radius of O-ring porton=0.047 in.
Material of elastomeric portion of gasket=FDA 70 Durometer EDPM, buna elastomer.
Material of peripheral incompressible ring portion of gasket=316L steel, sand blasted for adhesion to gasket; alternatively, a polyethersulfone such as "Radel™" may be used.
OD of peripheral ring 16=2.515 in; ID=2.218 in. Ring was 16 bonded to elastomeric portion using a chemical agent.

What has been described is deemed to be illustrative of the principles of the invention. Further and other modifications may be made by those skilled in the art without, however, departing from the spirit and scope of the invention.

What is claimed is:

1. A gasket for use in a joint between a pair of sanitary pipe flange faces having flat and grooved portions, said gasket comprising an O-ring portion for alignment with said grooved portion of said flange faces and at least one flat portion of compressible material having an uncompressed axial thickness (T) for forming a fluid-tight seal about the lumen of said pipe and a portion made of incompressible material, the axial thickness of said incompressible portion being dimensioned with respect to the axial thickness and percentage radial expansion of said compressible portion so as to limit axial compression of said compressible portion to an amount (t), the percentage radial expansion of said compressible portion being greater than the percentage of axial compression by the factor $$\left(\frac{1}{1-\frac{t}{T}}\right),$$

whereby the greater percentage radial expansion of said compressible portion is prevented from entering said lumen.

2. A gasket according to claim 1 wherein said incompressible portion includes a T-shaped portion adapted to fit an exterior shoulder of said pipe flange.

3. A gasket according to claim 2 wherein said T-shaped portion is fabricated of a material color coded to indicate the material of which said compressible portion is made.

4. A gasket according to claim 1 wherein said flat and said incompressible portions are connected by a web portion of thinner cross-section.

* * * * *

(12) EX PARTE REEXAMINATION CERTIFICATE (6134th)

United States Patent
Dupont et al.

(10) Number: US 6,857,638 C1
(45) Certificate Issued: Feb. 26, 2008

(54) GASKET FOR SANITARY FITTINGS

(75) Inventors: Paul Robert Dupont, Blairstown, NJ (US); Colin W. Haase, Western Springs, IL (US)

(73) Assignee: Rubber Fab, Inc., Andover, NJ (US)

Reexamination Request:
No. 90/008,332, Nov. 17, 2006

Reexamination Certificate for:
Patent No.: 6,857,638
Issued: Feb. 22, 2005
Appl. No.: 10/367,068
Filed: Feb. 14, 2003

(51) Int. Cl.
*F16L 33/16* (2006.01)
*F16L 17/06* (2006.01)

(52) U.S. Cl. .................. 277/608; 277/611; 277/616; 277/626; 285/336

(58) Field of Classification Search .................. None
See application file for complete search history.

(56) References Cited

FOREIGN PATENT DOCUMENTS

| JP | 63-60788 | 4/1988 |
|----|----------|--------|
| WO | WO01/48415 A1 | 7/2001 |

OTHER PUBLICATIONS

DuPont Dow Elastomers, Kaltrez©, "Introducing a New Standard of Cleanliness and Sealing Efficiency for Pharmaceutical Process Lines," www.dupont–dow.com/products/kalrez/sanitary_seal.html (2 pgs.) (2000).
Technical Information, Kaltrez© Sanitary Seals, Stainless Steel and Kalrez© Perfluoroelastomer Parts Combined in a Controlled–Compression Joint Seal that Provides Premium Performance, (2 pgs.).
Müller et al., Chapter 3: "Sealing Mechanism of Elastomer Seals" (pp. 39–53), Chapter 24: "Gaskets in Flanged Joints" (pp. 421–448), *Fluid Sealing Technology, Principals and Applications*, Marcel Dekker (1998).

*Primary Examiner*—Jeffrey R. Jastrzab

(57) ABSTRACT

A gasket for establishing a seal between the flanges of sanitary pipe fittings having a lumen of pre-determined diameter which comprises an O-ring portion of elastomeric material and incompressible ring member bonded to said O-ring portion, said ring member having a substantially flat cross-section to limit compression of the O-ring.

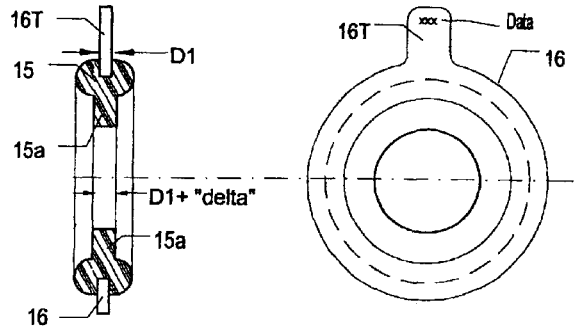
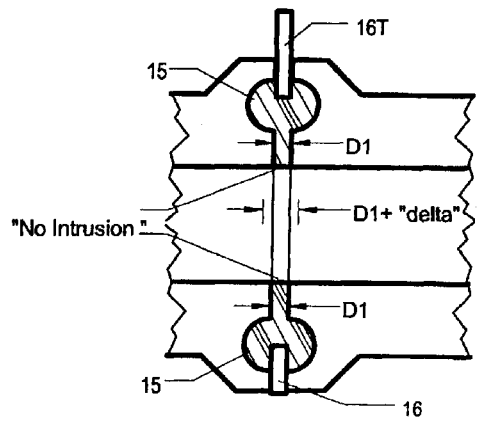

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2–4 were not reexamined.

* * * * *